United States Patent [19]
Odabashian

[11] Patent Number: 5,413,412
[45] Date of Patent: May 9, 1995

[54] EASY OPEN BAG
[75] Inventor: Robert A. Odabashian, Greer, S.C.
[73] Assignee: W.R. Grace & Co.-Conn., Duncan, S.C.
[21] Appl. No.: 21,714
[22] Filed: Feb. 24, 1993
[51] Int. Cl.$^6$ .......................... B65D 30/10; B31B 1/14
[52] U.S. Cl. ..................................... 383/208; 206/497; 493/223; 493/930
[58] Field of Search ................. 383/207, 208; 206/497; 229/206; 493/223, 233, 923, 930, 963

[56]  References Cited
U.S. PATENT DOCUMENTS 4,337,284  6/1982  Cooper et al. ..................... 383/205
5,067,612  11/1991  Tsuchiya et al. ................... 206/497

FOREIGN PATENT DOCUMENTS 961798  6/1964  United Kingdom ............... 493/963

Primary Examiner—Allan N. Shoap
Assistant Examiner—Jes F. Pascua
Attorney, Agent, or Firm—William D. Lee, Jr.; Mark B. Quatt; L. George Legg

[57]  ABSTRACT

A bag and a method and apparatus for forming an easy open bag wherein a said bag is formed of thermoplastic heat shrinkable film is disclosed. Specifically, an easy open thermoplastic heat shrinkable bag having a heat shrinkable thermoplastic tear strip panel sealed without adhesives or heat seals is disclosed. A method of making said easy open bag is also described.

4 Claims, 4 Drawing Sheets

EASY OPEN BAG

BACKGROUND OF THE INVENTION

1. Field of the Invention

This invention relates to a bag formed from heat shrinkable. thermoplastic film. In particular, this invention relates to a bag formed from thermoplastic film wherein the products packaged are food items and the bag is provided with an "easy-open" means.

2. Description of the Related Art

Food and other items are frequently packaged for retail purposes in shrinkable film that is then shrunk around the good. The film may initially be in the form of a bag in which even the bag is open at one end to permit the insertion of the goods or a product and is then sealed and shrunk around the product. It is often desirable to be able to provide the bag with an easy opening means, with a surface area upon which a label or printed matter may be placed, and with means for hanging the bag if that is desired.

Representative bags and containers employing shrink film features are found in, for example, U.S. Pat. No. 3,516,537 issued to Robert L. Dreyfus et al wherein is disclosed a package in which a plastic container having shrunken film walls and a product in the container is constructed so that film walls extending beyond the closure seal of the package form a flange section or skirt which is provide with a notch for the purpose of providing a tear Lab. In U.S. Pat. No. 4,249,659 issued to Henry G. Schirmer there is disclosed a bag and method of producing the bag by forming a pocket in a central portion of a sheet of wrapping material, which may be shrinkable thermoplastic film, placing a product within the pocket, folding the flat portions of the film into face-to-face contact and bonding the flat or flange portions together. In U.S. Pat. No. 4,000,325 issued to Gad A. Rausing here is disclosed a pressurized plastic container formed with transverse seals with a flattened area between the sealing zones. U.S. Pat. No. 3,641,732 issued to Masaaki Fujio discloses a bag in which a product is enclosed in plastic film which is heat shrinkable and which provides a tear tab protruding sideways from the bag. Another bag, shown in a patent to the same inventor, is disclosed in U.S. Pat. No. 3,679,048. In U.S. Pat. No. 3,889,870 issued to Hugo Bender a welded bag of stretched polyester film is shown in which the edge region of the bottom weld is post-stretched.

In U.S. Pat. No. 3,140,815 issued to John D. Majeskey a thermoplastic heat sealed bag is disclosed having heavily heat sealed tear and tie strip over a line of tear perforations. The tear strip panel must be permanently sealed at one end so that it may perform its function as a tie strip for resealing the bag. U.S. Pat. No. 3,391,851 discloses a tear tab which is adhesively sealed over a perforation on a heat shrunk container. Likewise, U.S. Pat. No. 3,175,752 issued to G. C. Stabenow discloses another form of adhesively attached tear tab on a heat shrinkable container. Canadian Patent No. 1,287,309 issued to Steven L. Fuller discloses a film bag with perforations sealed with a tear tab attached to the bag using a pressure sensitive adhesive.

In U.S. Pat. No. 4,768,411 is disclosed a thermoplastic film bag having tear propagation cuts in the outer edges of the bag seam seals. These cuts allow for the easy tearing open of the bag.

U.S. Pat. No. 4,755,403 discloses a thermoplastic heat shrinkable bag having a protective patch to reduce the likelihood of the bag being punctured or ruptured by the bag contents. The protective patches are heat shrinkable and therefore have a lesser tendency to delaminate when the bag they are adhesively attached to are heat shrunk around the contained product.

OBJECTS AND SUMMARY OF THE INVENTION

One object of the present invention is to provide a heat shrinkable thermoplastic bag having a heat shrinkable thermoplastic tear strip panel attached thereto for easy opening of the bag.

Another object of the present invention is to provide a heat shrinkable thermoplastic bag having a heat shrinkable thermoplastic tear strip panel attached thereto without the need of adhesives or heat seal seam welding.

Yet another object of the present invention is to provide a bag which is an improvement over prior shrink wrap bags which are used to display products to retail purchasers.

Another object of the present invention is to provide tear tabs which are immediately obvious to the consumer who is about to open the bag.

In many bags on the market today the opening means are obscured by printing of other subject matter on the bag or the opening means consists of hard-to-separate overlying pieces of film. An object of the present invention is to overcome these deficiencies.

One form of the present invention relates to a thermoplastic heat shrinkable easy opening bag comprising, congruent front and rear panels of a thermoplastic heat shrinkable material superimposed and laying flat one against the other and defining the front and rear of a bag, the panels having longitudinal side edges joined fluid-tight to form bag side edges and the panels having common ends including a first end having a continuous transverse heat seal, and an opposite open end, said panels further having a line of perforations cut therein, and a tear tab panel of a thermoplastic heat shrinkable material superimposed over the outer surface of each congruent front and rear panel and covering and sealing the line of perforations cut into each of said front and rear panels; further characterized in that said tear tab panel is bonded to said congruent front and rear panels by corona treatment bonding.

Another form of the present invention relates to a process of producing the thermoplastic heat shrinkable easy opening bag comprising the steps of, providing congruent front and rear panels of a thermoplastic heat shrinkable material superimposed and laying flat one against the other and defining the front and rear of a bag, the panels having longitudinal side edges joined fluid-tight to form bag side edges and the panels having common ends including a first end having a continuous transverse heat seal, and an opposite open end, treating a portion of the outside surface of said front and rear panels with a corona treating means, said front and rear panels, in the corona treated portion, further having a line of perforations cut therein by a perforation cutting means, and bonding a tear tab panel of a thermoplastic heat shrinkable material, having a portion thereof corona treated by a corona treating means, over the outer surface of said congruent front and rear panels and covering and sealing the line of perforations cut into each of said front and rear panels, further characterized in that said tear tab panel is bonded to said congruent front and rear panels by corona treatment bonding.

A further form of the Invention relates to a thermoplastic heat shrinkable easy opening bag comprising: congruent front and rear panels of a thermoplastic heat shrinkable material superimposed and laying flat one against the other and defining the front and rear of a bag, the panels having longitudinal side edges joined fluid-tight to form bag side edges and the panels having common ends including a first closed end, and an a second opposite open end; at lease one of said panels further having a line of perforations cut therein; and a tear tab panel of a thermoplastic heat shrinkable material superimposed over the outer surface of said at least one perforated panel and covering and sealing the line of perforations cut into said at least one perforated panel; further characterized in that said tear tab panel is bonded to said at least one perforated panel by corona treatment bonding.

A still further embodiment of the invention relates to a process of producing the thermoplastic heat shrinkable easy opening bag comprising the steps of: providing congruent front and rear panels of a thermoplastic heat shrinkable material superimposed and laying flat one against the other and defining the front and rear of a bag, the panels having longitudinal side edges joined fluid-tight to form bag side edges and the panels having common ends including a first closed end, and a second opposite open end; treating a portion of the outside surface of at least one of said front and rear panels with a corona treating means; said at least one panel, in the corona treated portion, further having a line of perforations cut therein by a perforation cutting means; and bonding a tear tab panel of a thermoplastic heat shrinkable material, having a portion thereof corona treated by a corona treating means, over the outer surface of said at least one perferated panel and covering and sealing the line of perforations cut into said at least one panel; further characterized in that said tear tab panel is bonded to said at least one panel by corona treatment bonding.

Preferred forms of the invention, as well as other embodiments, objects, features and advantages of this invention, will be apparent from the following detailed description, and illustrative embodiments thereof, which are to be read in connection with the accompanying drawings.

DESCRIPTION OF THE PREFERRED EMBODIMENTS OF THE INVENTION

Figure 1:
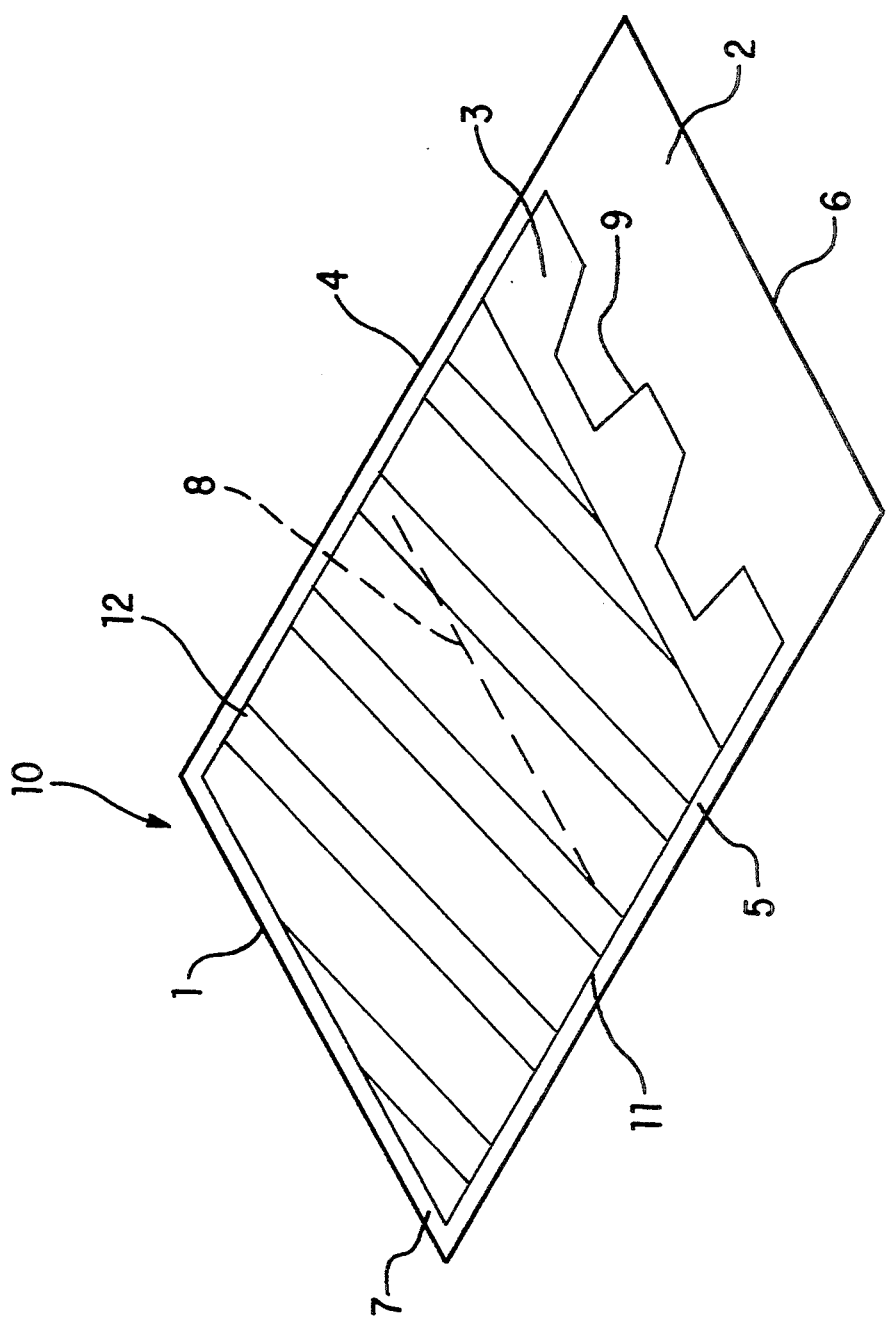
FIG. 1 shows a perspective view of one embodiment of the easy open bag of the present invention.

The present invention will be better understood from the specification taken in conjunction with the accompanying drawings in which like reference numerals refer to like parts.

In FIG. 1 is shown a preferred embodiment of the present invention having a heat shrinkable thermoplastic bag 10, comprising congruent film panels 1 and 2, formed from a tubing web in a lay-flat position. Said congruent film panels 1 and 2 having sealed edges 4 and 5 and folded bag end 6, thus forming a bag type package with an open end 7. Additionally, congruent film panels 1 and 2 have a row of perforations 8 cut therein to allow for easy opening of the bag 10. The perforations 8 may be cut in a transverse direction (as shown here) or in a longitudinal direction as desired, though transverse is preferred, and applicable to the product to be packaged. Perforations 8 are sealed by tear strip panels 3 which are corona treated to congruent panels 1 and 2, which are also corona treated, over said perforations 8. Tear strip panels 3 are further provided with tab areas 9 which is not corona treated, and are not bonded to congruent panels 1 and 2 to allow for easy grasping and tearing of tear strip panels 3. The edges of congruent panels 1 and 2, at the open end of the bag 10, may be abutting, but preferably, one congruent panel is longer than the other congruent panel to allow for easier opening of the bag during insertion of the product (not shown) to be packaged.

Congruent film panels 1 and 2 also may be separate sheets of film or made from tubing web which has first been edge slit into separate sheets of film before processing into bags. Furthermore, while the preferred embodiment has perforations 8 cut into both congruent panels it is understood that said perforation 8 may be cut into only one congruent panel. When such is the case only one tear strip panel 3 is needed. Suitable film compositions which may be used in the present invention, for congruent film panels 1 and 2 as well as tear strip panel 3, are those heat shrinkable thermoplastic films having surfaces which are susceptible to corona treatment, such films being well known in the art. Examples of suitable films include, for example, polyethylene, EVA, as well as blends of both. Further, the congruent film panels 1 and 2 and tear strip panels 3, may be of the same material or of different materials. It is understood that congruent panels 1 and 2 may be the same or different compositions and that tear strip panel 3 may be of the same composition as panels 1 or 2 or different. Preferably, both congruent film panels and tear strip panel 3 are of the same material. The congruent film panels 1 and 2 and tear strip panel 3 should, preferably, have the same shrink characteristics to help ensure the integrity of the bag and the tear strip panel seal after being filled with product and heat shrunk.

Heat shrinking of the product filled bag causes the tab areas 9 of tear strip panels 3 to thicken thereby providing an easily grasped tab for tearing the tear strip panel 3 from the bag thereby allowing air into the bag through perforations 8. This in turn allows for easy grasping and pulling apart of the film panels 1 and 2, causing the perforations 8 to propagate and thereby opening the bag.

Figure 2:
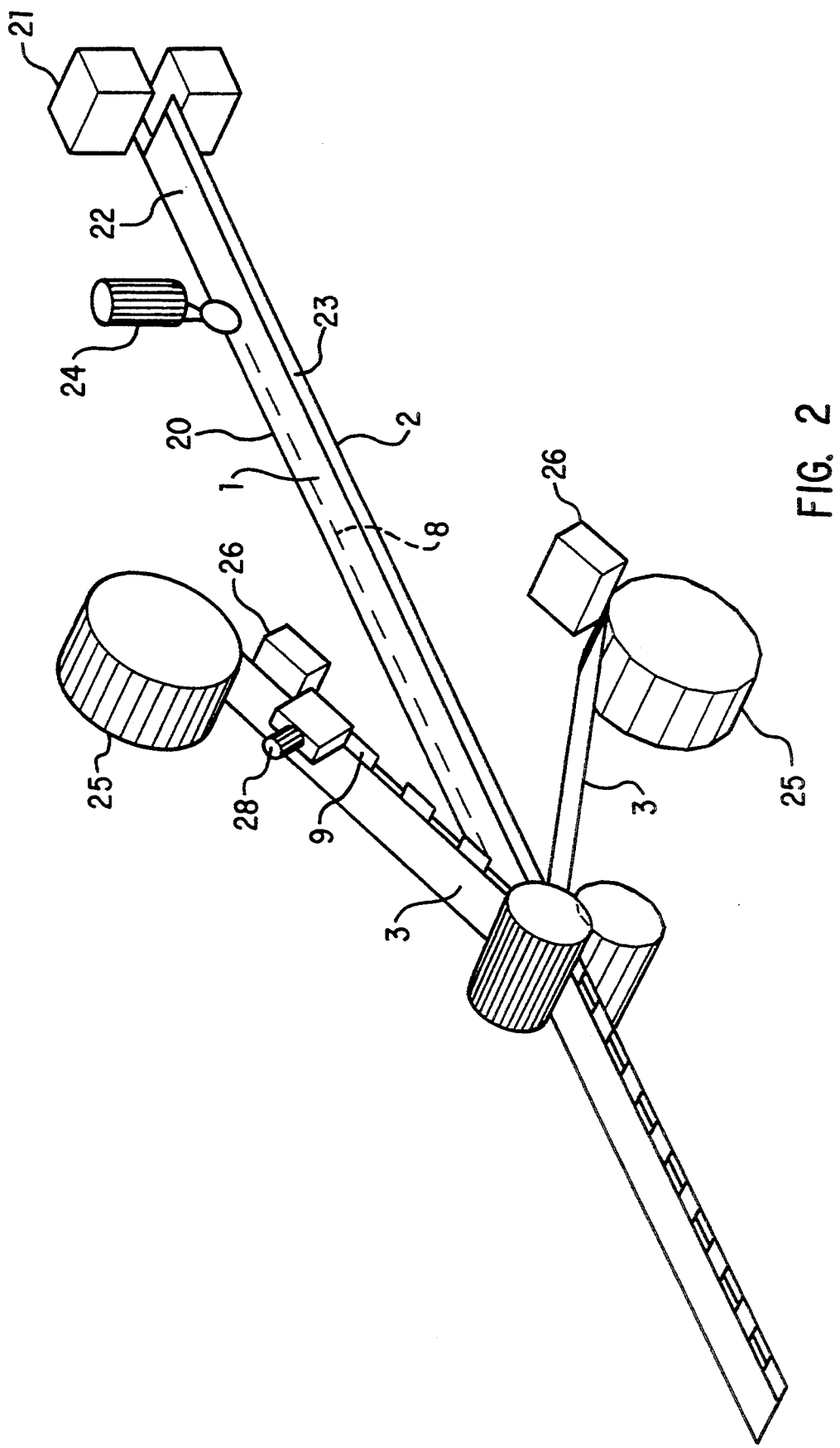
FIG. 2 shows a schematic view of one embodiment of the process for making the easy open bag of the present invention.

FIG. 2 shows a schematic of a preferred process for making the easy open bag of the present invention. A tubing web 20 having congruent film panels 1 and 2 passes through a corona treatment section 21 where the area receiving tear strip panel 3 on both congruent panels 1 and 2 is treated. Each congruent film panel 1 and 2 has left an untreated area 23 over which the tab areas 9 will be located. The tubing web 20 is then perforated by knife 24 making perforations 8 therein. The films 25 which is applied as tear strip panel 3 to congruent film panels 1 and 2 is corona treated on the side which will come in contact with congruent film panels 1 and 2 in treatment sections 26. The portion of films 25 which will become tab areas 9 is not corona treated. At stations located just before the films 25 come into contact with the congruent film panels 1 and 2, a punch 28 cuts out a section of the films 25 which is not corona treated to form tab areas 9. During this operation, the films 25 are also welded to the congruent panels 1 and 2 with seals 11 and 12 (see FIG. 1). The specific equipment and procedures to produce the bag of the present invention is well known and understood by those skilled in the art and no further discussion is required.

Figure 3:
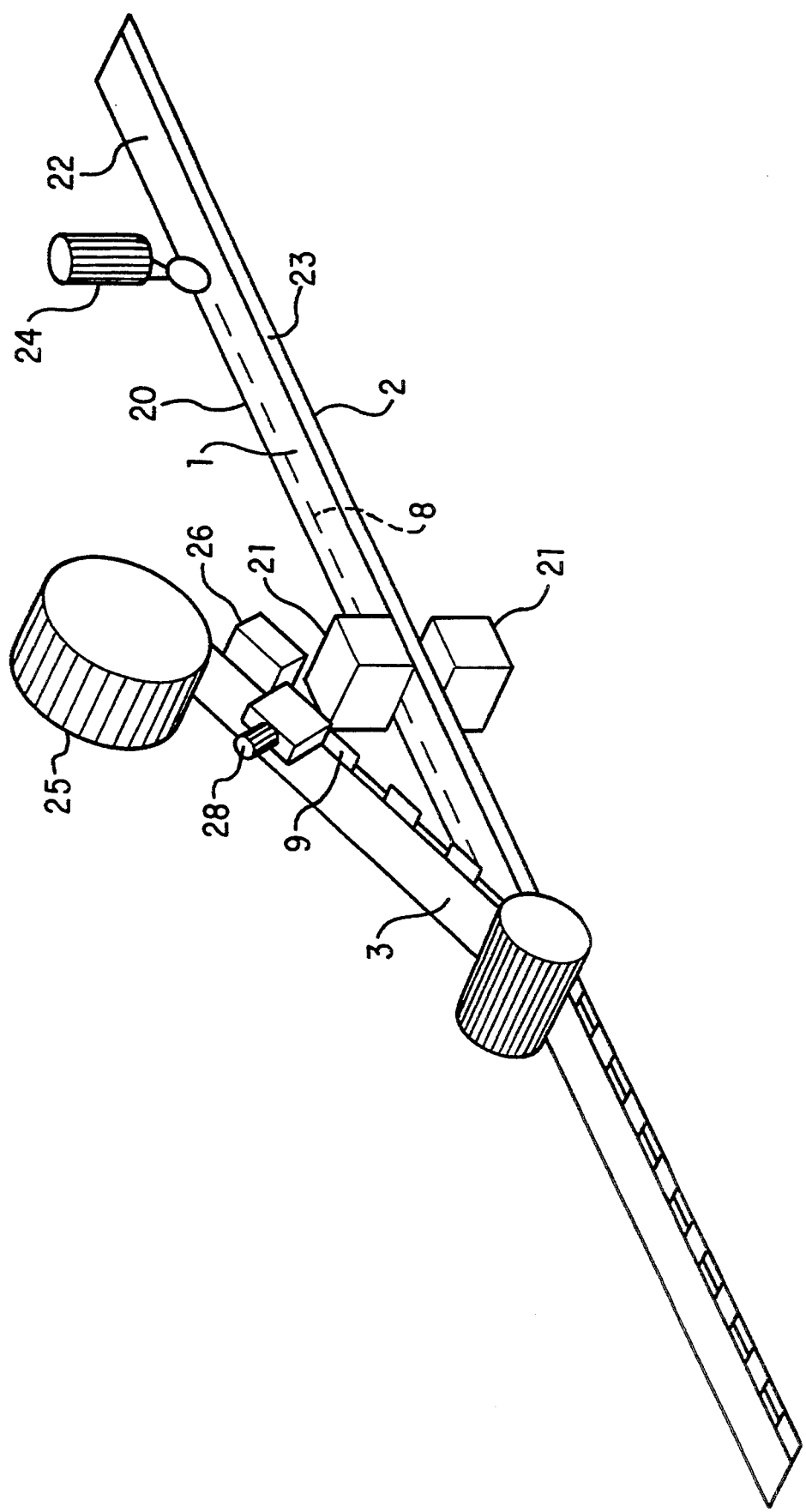
FIG. 3 shows a schematic view of another embodiment of the process for making the easy open bag of the present invention.

FIG. 3 shows a schematic of a preferred process for making the easy open bag of the present invention. This process is similar to that shown in FIG. 2 with the exceptions that the corona treatment section 21 is located such that the film has perforations 8 made before corona treatment. Methods and apparatus for slitting a film web and for separating the slit layers are well known and understood in the art and no further description is required herein. This allows the film web 20 to be slit on one edge by a slitting means (not shown) the layers separated by a separation means (not shown) such that the perforations 8 made by knife 24 are cut in one layer of film web 20 only. In this preferred embodiment only one roll of film 25 to make tear strip 3 and only one corona treatment section 26 is required.

Figure 4:
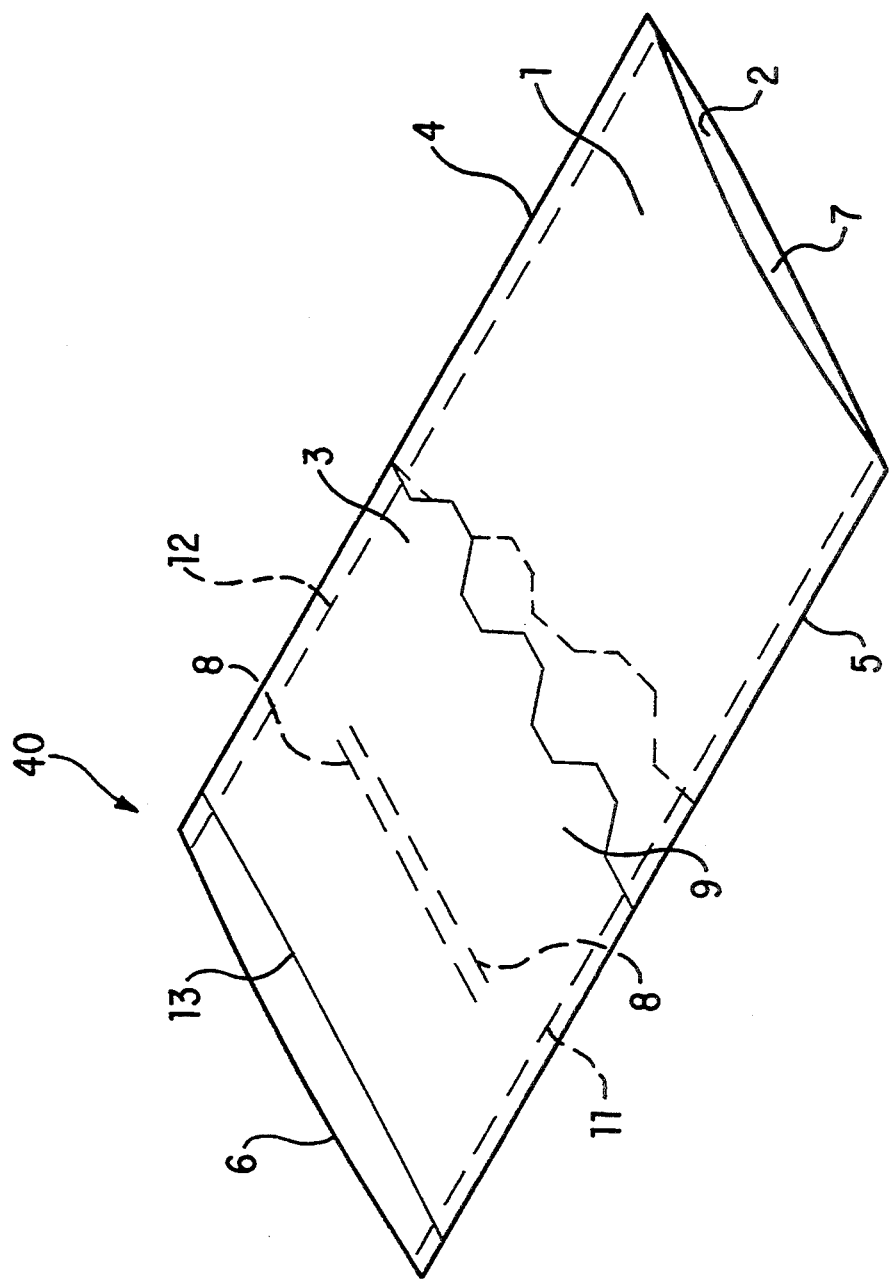
FIG. 4 shows a perspective view of another embodiment of the easy open bag of the present invention.

In FIG. 4 is shown another preferred embodiment of the present invention having a heat shrinkable thermoplastic bag 40, comprising congruent film panels 1 and 2, formed from a tubing web in a lay-flat position and slit along one edge. Said congruent film panels 1 and 2 having sealed edges 4 and 5 and folded edge bag end 6, thus forming a bag type package with an open end 7. Additionally, congruent film panels 1 and/or 2 have a row of perforations 8 cut therein to allow for easy opening of the bag 40. The perforations 8 may be cut in a transverse direction (as shown here) or in a longitudinal direction as desired and applicable to the product to be packaged. Perforations 8 are sealed by tear strip panels 3 which are corona treated and applied to congruent panels 1 and/or 2 which are also corona treated, over said perforations 8. Tear strip panels 3 are further prodded with tab areas 9 which is not corona sealed to congruent panels 1 and/or 2 to allow for easy grasping and tearing of tear strip panels 3. The edges of congruent panels 1 and 2, at the open end of the bag 40, are usually abutting, but one congruent panel may be longer than the other congruent panel to allow for easier opening of the bag during insertion of the product (not shown) to be packaged.

While the preferred embodiment has perforations 8 cut into both congruent panels it is understood that said perforation 8 may be cut into only one congruent panel. When such is the case only one tear strip panel 3 is needed. Suitable film compositions which may be used in the present invention, for congruent film panels 1 and 2 as well as tear strip panel 3, are those heat shrinkable thermoplastic films having surfaces which are susceptible to corona treatment, such films being well known in the art. Examples of suitable films include, for example, polyethylene, EVA, as well as blends of both. Further, the congruent film panels 1 and 2 and tear strip panels 3, may be of the same material or of different materials. It is understood that congruent panels 1 and 2 may be the same or different compositions and that tear strip panel 3 may be of the same composition as panels 1 or 2 or different. Preferably, both congruent film panels and tear strip panel 3 are of the same material. The congruent film panels 1 and 2 and tear strip panel 3 should, preferably, have the same shrink characteristics to help ensure the integrity of the bag and the tear strip panel seal after being filled with product and heat shrunk.

Heat shrinking of the product filled bag causes the tab areas 9 of tear strip panels 3 to thicken thereby providing an easily grasped tab for tearing the tear strip panel 3 from the bag thereby allowing air into the bag through perforations 8. This in turn allows for easy grasping and pulling apart of the film panels 1 and 2, causing the perforations 8 to propagate and thereby opening the bag.

Thus, the bag of the present invention is constructed without the need of separate adhesives and the additional manufacturing steps necessitated by such adhesive bonding. Further, the bag of the present invention does not require or utilized heat seals to attach the tear strip panel 3 to the congruent film panels 1 and 2, thereby eliminating additional processing steps and the inherent cost thereof.

In use the bag of the present invention is filled, vacuumized and heat shrunk at the packaging plant. The tear strip panels 3 being of the same composition as congruent film panels 1 and 2, or at least exhibiting the same shrink rate, shrinks with the bag. The untreated tab areas 9 also shrinks and thickens during the heat shrinking process and thereby provides an easily grasped pull tab which can be pulled, causing the tear strip panel 3 to be torn off. Once the tear strip panel 3 is removed, air moves into the bag, allowing the bag to be pulled in opposite directions so as to strain the perforations 8 in a manner that will cause the slits to propagate, thus opening the bag.

Although the illustrative embodiments of the present invention have been described herein with reference to the accompanying drawings it is to be understood that the invention is not limited to those precise embodiments, and that various other changes and modifications may be effected therein by one skilled in the art without departing from the scope or spirit of the invention.

What is claimed is:

1. A thermoplastic heat-shrinkable easy opening bag comprising:

(a) congruent front and rear panels of a thermoplastic heat-shrinkable material defining the front and rear of the bag, the front and rear panels having longitudinal side edges joined fluid-tight to form bag side edges and the front and rear panels having common ends including a first closed end and a second opposite open end;

(b) at least one of said front and rear panels having a line of perforations therein; and (c) a tear tab panel of a thermoplastic heat shrinkable material adhered to the outer surface of said at least one perforated panel and positioned to cover and seal the line of perforations in said at least one perforated panel; wherein each of said tear tab panel and said at least one perforated panel has a corona-treated surface at which said tear tab panel and said at least one perforated panel are mutually adhered.

2. The thermoplastic heat-shrinkable easy opening bag as claimed in claim 1, wherein each of the front and rear panels of said bag has a line of perforations covered and sealed by a tear tab panel so adhered to each of said front and rear panels and wherein each tear tab panel and perforated panel has a corona-treated surface at which each tear tab panel and perforated panel are mutually adhered.

3. A process of forming a thermoplastic heat-shrinkable easy opening bag, comprising the steps of:
 (a) providing a thermoplastic heat-shrinkable material;
 (b) forming the bag from said material, the bag having congruent front and rear panels having longitudinal side edges and having common ends including a first end and a second opposite end, each of said side edges defining a closed, fluid-tight boundary, said first end also defining a closed, fluid-tight boundary, and said second end having edges defining an opening to permit insertion therethrough of a product into the bag;
 (c) providing a first tear tab panel of a thermoplastic heat-shrinkable material;
 (d) treating a portion of the outside surface of at least one of the front and rear panels or first tear tab panel with a corona treating mean;
 (e) introducing a line of perforations into the surface of said at least one of the front and rear panels;
 (f) adhering said perforated panel to said first tear tab panel by said corona-treated surface portion whereby the first tear tab panel covers and seals the line of perforations; and
 (g) corona-treating both a portion of the outside surface of said at least one of the front and rear panels and a surface of said first tear tab panel prior to conducting step (f) by mutually adhering the corona-treated surfaces.

4. A process of forming a thermoplastic heat-shrinkable easy opening bag, comprising the steps of:
 (a) providing a thermoplastic heat-shrinkable material;
 (b) forming the bag from said material, the bag having congruent front and rear panels having longitudinal side edges and having common ends including a first end and a second opposite end, each of said side edges defining a closed, fluid-tight boundary, said first end also defining a closed, fluid-tight boundary, and said second end having edges defining an opening to permit insertion therethrough of a product into the bag;
 (c) providing a first tear tab panel of a thermoplastic heat-shrinkable material;
 (d) treating a portion of the outside surface of at least one of the front and rear panels or first tear tab panel with a corona treating means;
 (e) introducing a line of perforations into the surface of said at least one of the front and rear panels;
 (f) adhering said perforated panel to said first tear tab panel by said corona-treated surface portion whereby the first tear tab panel covers and seals the line of perforations;
 (g) providing a second tear tab panel so that each of said front and rear panels has a tear tab panel associated therewith to thereby constitute two pairs of panels;
 (h) carrying out steps (d) through (f) on each of said pair of panels; and
 (i) treating a portion of the outside surface of both of said front and rear panels and both of said tear tab panels, prior to conducting steps (e) through (f).

* * * * *